United States Patent
Morgan

[11] Patent Number: 6,086,838
[45] Date of Patent: Jul. 11, 2000

[54] REMOVAL OF SILANE FROM GAS STREAMS

[76] Inventor: Vernon E. Morgan, 7607 Glenshannon Cir., Dallas, Tex. 75225

[21] Appl. No.: 09/213,661

[22] Filed: Dec. 17, 1998

[51] Int. Cl.[7] .................................................. C01B 33/08
[52] U.S. Cl. ........................... 423/342; 423/210; 423/341
[58] Field of Search ..................................... 423/210, 341, 423/342

[56] References Cited

U.S. PATENT DOCUMENTS 4,252,780  2/1981  Koppl et al. ............................ 423/335

FOREIGN PATENT DOCUMENTS 02035912  2/1990  Japan .

*Primary Examiner*—Steven P. Griffin
*Assistant Examiner*—Maribel Medina
*Attorney, Agent, or Firm*—Jack A. Kanz

[57] ABSTRACT

Silane is removed from the exhaust gas of silicon CVD reactors by injecting a stoichiometric excess of halogen to produce halosilanes which are hydrolyzed in water. The removal method permits the use of small individual reactors at each CVD reactor site and eliminates the collection and transport of hazardous gases to a central disposal site for destruction.

8 Claims, 1 Drawing Sheet

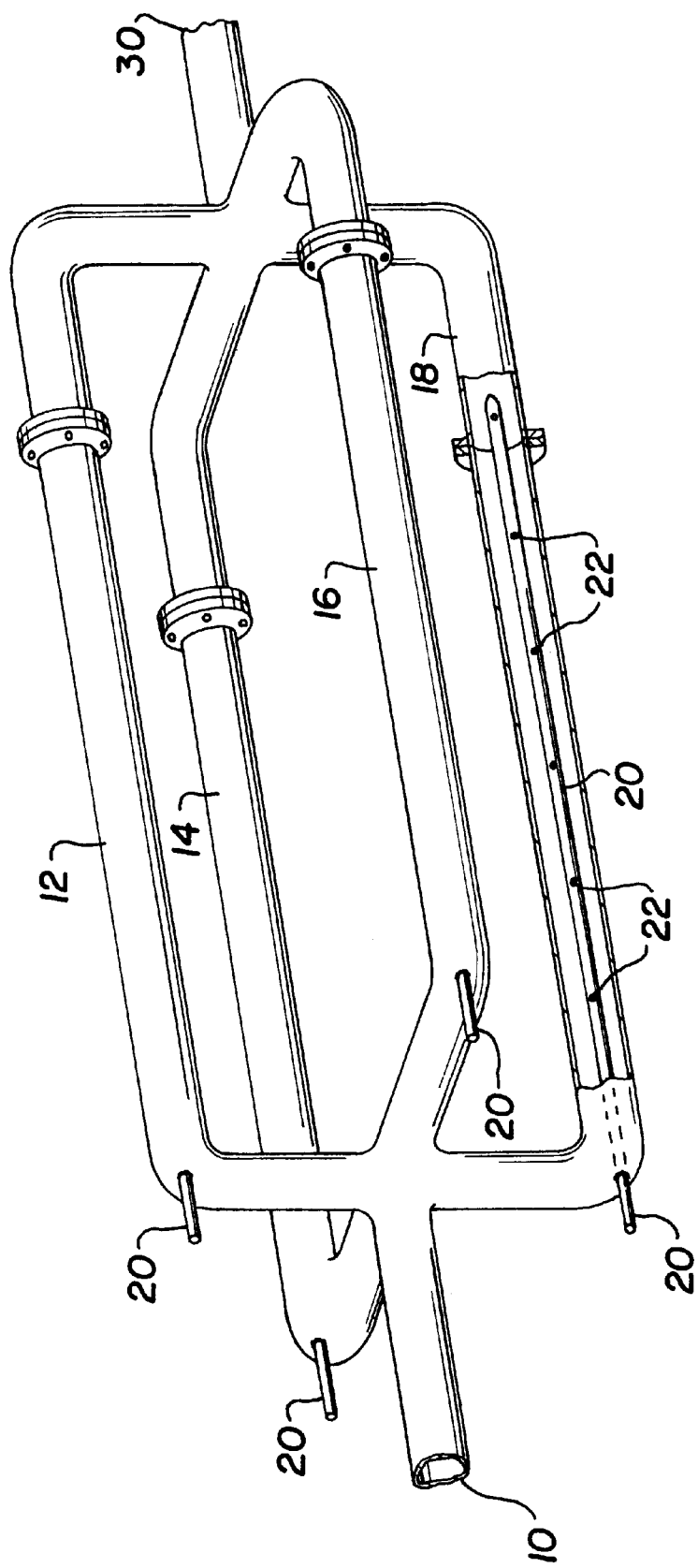

REMOVAL OF SILANE FROM GAS STREAMS

This invention relates to removal of silane from gas streams. More particularly, it relates to methods and apparatus for removing silanes from exhaust gases generated by semiconductor production processes. The process includes reacting the silane with a halogen and hydrolyzing the silicon halide products to produce materials which can be safely and economically scrubbed from the process stream with water.

Chemical vapor deposition (CVD) epitaxy has long been used in the semiconductor industry to form semiconductor materials. Typically, commercial CVD production of semiconductor silicon involves hydrogen reduction of chlorosilanes such as silicon tetrachloride, trichlorosilane and/or dichlorosilane. More recently, CVD production of silicon using silane ($SiH_4$) has gained popularity because silane-based epitaxy occurs at lower temperatures; minimizes defect levels, auto-doping and interdiffusion; and improves film purity and uniformity of resistivity.

Unfortunately, because of the instability of hydrogen bonding of Si—Si chains in silane and the low Si—H bond energy, silane is highly reactive and therefore dangerous to handle. In fact, it is pyrophoric and becomes a fire hazard when exposed to air.

Since the exhaust gas from CVD processes employing silane contains unreacted silane, the exhaust gas is extremely hazardous. Conventionally, disposal of silane-containing exhaust gas requires massive dilution with air followed by combustion using direct fired burners fueled by hydrogen, natural gas or the like. Unfortunately, combustion and oxidation of silane in air produces large quantities of hydrophobic particulates dispersed in large volumes of air which, of course, are very difficult to collect and require expensive large scale filtering, scrubbing or other separation equipment. Such equipment is, of necessity, usually centrally located in a processing plant to minimize initial as well as operating and maintenance costs. Central location, however, requires a complicated delivery system to transport the exhaust gases from multiple CVD reactors to a single disposal site. Such collection and disposal systems are thus expensive to operate and maintain and are extremely hazardous. More efficient and simpler disposal systems which may be used at the site of each individual CVD reactor are thus highly desirable.

In accordance with the present invention silane contained in a flowing gas stream exiting a CVD reactor is removed from the gas stream by mixing a halogen gas with the flowing stream of exhaust gas in amounts in excess of the stoichiometric amount of excess silane in the exhaust gas. Reaction of excess halogen with silane converts the silane into silicon halides and hydrogen halide acids, all of which are readily dissolved in water. Furthermore, the silicon halides are readily hydrolyzed to yield silicon dioxide which remains dispersed in the water.

By injecting the halide into the exhaust gas at or near its exit from the reactor and then mixing the exhaust gas with water, the size of the exhaust gas treatment equipment may be minimized sufficiently to be located at the exit of each individual CVD reactor. More importantly, relative small amounts of water are used and the end product is completely free of hazardous materials. Other features and advantages of the invention will become more readily understood from the following detailed description taken in connection with the appended claims and attached drawing in which the sole figure is a perspective view, partially broken away, of a multiple tube reactor for practicing a preferred method of the invention.

The drawing is not to scale. It is incorporated herein to illustrate a presently preferred embodiment of an exhaust gas reactor apparatus. The drawing should not be construed to limit the invention to that illustrated or the embodiments described.

For purposes of illustration, the invention is disclosed herein with specific reference to removing silane ($SiH_4$) from the exhaust gas of a CVD reactor used to form epitaxial deposits of silicon. In the specific examples discussed, chlorine is used as the halogen. It will be recognized, however, that chlorine is used as a representative halogen which is readily available and thus a preferred embodiment of the invention.

In typical CVD reactions using silane, the process stream flowing through the CVD reactor includes $SiH_4$ at about two (2) liters/minute. The process stream may contain other gases such as $NH_3$ at about four to about five (4–5) liters/minute. Frequently $N_2$ (at about forty (40) liters per minute) is leaked into the exhaust stream by seal and pump systems. It will be appreciated that the flow rates given are examples only. Larger or smaller reactors performing different semiconductor processing steps will employ different flow rates. In any case, however, the exhaust gas will contain excess silane when the reactor is used to deposit silicon by reduction of silane. Obviously, all the $SiH_4$ is not consumed in the deposition process and the excess $SiH_4$ exits the reactor in the exhaust gas.

In accordance with the preferred embodiment of the invention, a stoichiometric excess of a halogen gas is injected into and mixed with the exhaust gas as soon as practicable after the exhaust gas has exited the CVD reactor. Halogens react readily with silane to form halosilanes and, if sufficient halogen is available, tend to produce the tetra-halogen form:

$$SiH_4 + 4F_2 \rightarrow SiF_4 + 4HF$$

$$SiH_4 + 4Cl_2 \rightarrow SiCl_4 + 4HCl$$

$$SiH_4 + 4Br_2 \rightarrow SiBr_4 + 4HBr$$

$$SiH_4 + 4I_2 \rightarrow SiI_4 + 4HI$$

This reaction, however, is highly exothermic. Therefore, in order to insure thorough mixing of silane and halogen while avoiding overheating the reaction tube, the exhaust from a CVD reactor is preferably directed into a tube such as shown in the drawing which divides the exhaust gas stream into multiple parallel reaction tubes 12, 14, 16, 18, all of which extend between the inlet 10 and the outlet 30. A sparger 20 in the form of a small tube with holes 22 therein is suspended in each reaction tube 12, 14, 16, 18 with its inlet extending through an end wall and connected to a controlled source of gaseous halogen. By dividing the mixing tube into a plurality of parallel reaction tubes with a sparger in each tube, the halogen is thoroughly mixed with the exhaust gas but the mixing is distributed over an extended surface area which is available to dissipate a portion of the reaction energy released.

Since silane reacts violently with halogens, it is preferred that the rate of reaction be slowed by dilution, cooling or the like to keep the internal surfaces of the reaction tube below about 200°. Keeping the reaction tube at lower temperatures minimizes polymer formation and degradation of the reaction tube. The reaction products formed in the multiple reaction tubes are then combined and directed into a single outlet 30 for injection into a water bath.

If desired, the reaction tube (either the multiple tube as shown in the drawing or a single reaction tube of other configuration) may be cooled by immersion in a bath of air, water or other cooling fluid. Alternatively (or simultaneously), a relatively inert gas such as nitrogen, argon or the like may be injected into the reaction tube to dilute the reacting gases and thus slow the rate of reaction and absorb some of the reaction energy released.

The halosilanes formed as described above are readily hydrolyzed to form silicon dioxide and halogen acids $$SiCl_4 + H_2O \rightarrow SiO_2 + 4HCl$$

$$SiBr_4 + H_2O \rightarrow SiO_2 + 4HBr$$

$$SiI_4 + H_2O \rightarrow SiO_2 + 4HI$$

all of which are readily suspended or dissolved in water. Thus the reaction of silane with halogen immediately destroys the hazardous pyrophoric silane to form products which are readily dissolved in water and scrubbed from the exhaust gas by commercial treatments.

While it is preferred that sufficient halogen be injected into the exhaust gas to fully convert the silane to the tetrahalogen form, the dihalogen and the trihalogen forms also hydrolyze sufficiently when injected directly into water.

It should be noted that ammonia is often present in the exhaust gas from semiconductor CVD process reactors. Ammonia, however, is also removed in a similar manner without interfering with the silane removal process. For example:

$$SiH_4 + 4NH_3 + 8Cl_2 \rightarrow SiCl_4 + 4HCl + 4NH_4Cl + 4Cl_2$$

While ammonium chloride tends to form particulates, it is readily dissolved in water and thus may be scrubbed from the exhaust gas along with the other reaction products.

It should be noted that the invention directly addresses the problem of removing silane from an exhaust gas stream by reacting it with halogen. Since the reaction products are readily hydrolyzed to form relatively non-hazardous materials, various conventional methods may be used to treat the water effluent.

From the foregoing it will be recognized that the principles of the invention may be employed in various arrangements to obtain the benefit of the many advantages and features disclosed. It is to be understood, therefore, that even though numerous characteristics and advantages of the invention have been set forth together with details of the function, use and practice of the invention, this disclosure is to be considered illustrative only. Various changes and modifications may be made in detail, especially in matters of materials used as well as size, shape and arrangement of parts, without departing from the spirit and scope of the invention as defined by the appended claim.

What is claimed:

1. The method of removing silane from the continuously flowing exhaust stream from a silicon vapor deposition reactor comprising the steps of:

(a) directing a continuously flowing stream of exhaust gas from a silicon vapor deposition reactor through a reaction tube;

(b) injecting gaseous halogen into said reaction tube; and (c) continuously mixing said stream of flowing exhaust gas and the reaction products therein with water.

2. The method set forth in claim 1 including the step of diluting said stream of exhaust gas with relatively inert gas to control the temperature of said stream by slowing the rate of reaction of silane with halogen and by absorbing at least part of the thermal energy released by the reaction of halogen and silane in said stream.

3. The method set forth in claim 1 including the step of subjecting said reaction tube to cooling fluid.

4. The method set forth in claim 1 wherein said gaseous halogen is chlorine.

5. The method set forth in claim 1 wherein said gaseous halogen is bromine.

6. The method set forth in claim 1 wherein said gaseous halogen is iodine.

7. The method set forth in claim 1 wherein said stream of exhaust gas is divided and directed into a plurality of reaction tubes.

8. The method set forth in claim 7 wherein gaseous halogen is injected into each of said plurality of reaction tubes.

* * * * *